Dec. 23, 1958 A. D. LE VANTINE 2,865,403
FLEXIBLE PRESSURIZED CONDUIT
Filed May 7, 1957 2 Sheets-Sheet 2

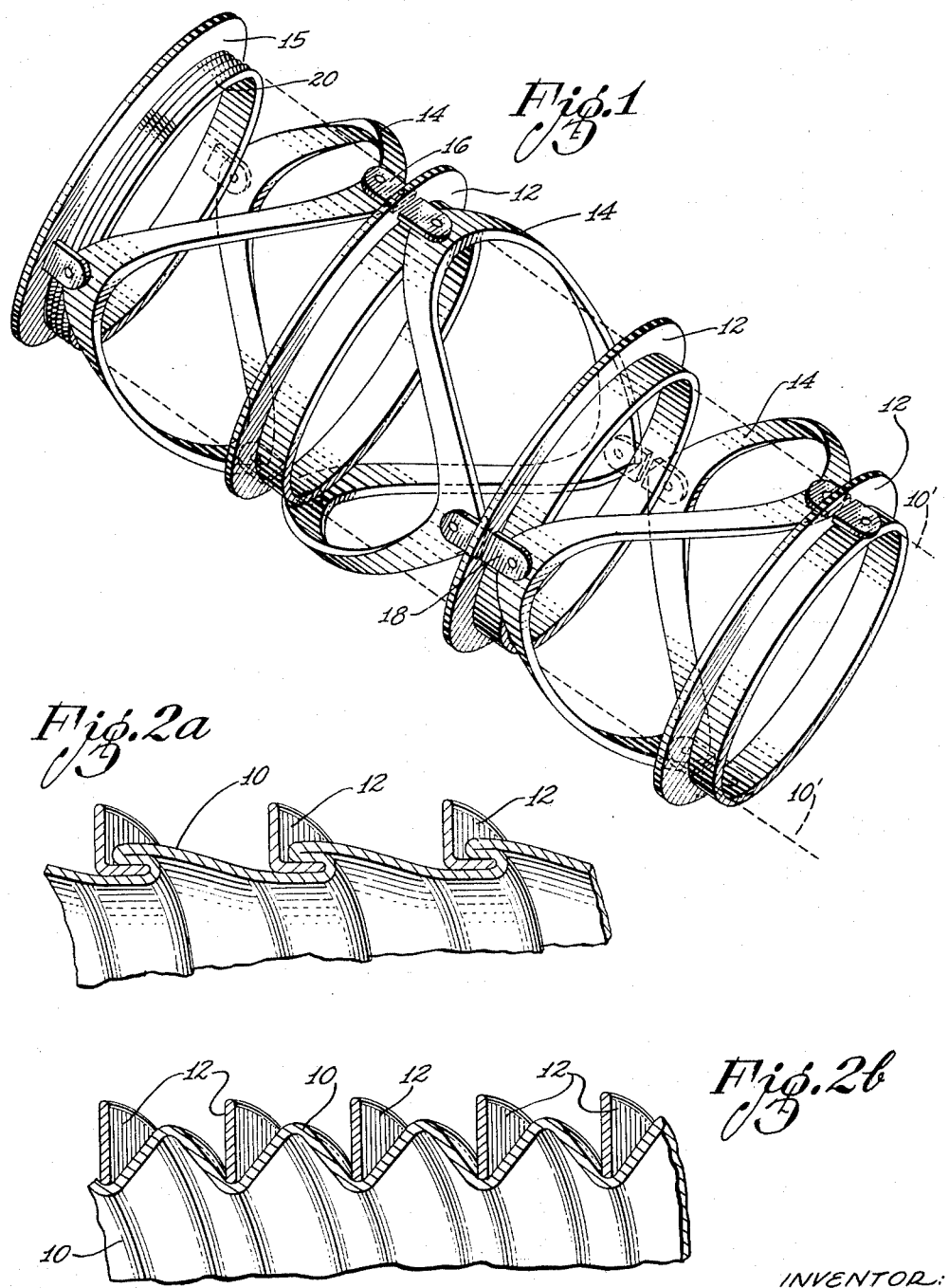

INVENTOR:
Allan D. LeVantine

By Robert H. Lentz
Attorney

United States Patent Office 2,865,403
Patented Dec. 23, 1958

2,865,403

FLEXIBLE PRESSURIZED CONDUIT

Allan D. Le Vantine, Tarzana, Calif., assignor to Litton Industries of California, Beverly Hills, Calif.

Application May 7, 1957, Serial No. 657,581

5 Claims. (Cl. 138—50)

This invention relates to a flexible pressurized conduit and more particularly to a flexible pressurized conduit which employs a plurality of interconnected rings to provide complete flexibility throughout its bending range despite a pressure differential between the internal pressure of the conduit and the external pressure.

In the prior art, numerous forms of flexible conduits have been employed for transferring or containing fluids, both gaseous and liquid, under pressure. In many of these applications the ends of the conduit are affixed to relatively massive objects, as for example in refueling vessels at sea, and the tendency of high pressures within the conduit to elongate or deform the conduit are of little or no consequence. There are many applications, however, in which it is desirable to have the conduit as flexible when it is under pressure as it is when there is no pressure differential between the interior and exterior of the conduit. It is in these latter applications that the conventional flexible conduits frequently prove unsatisfactory owing to the fact that the pressure within the conduit tends to deform the conduit to that configuration which provides the maximum volume for the fluid therein; for example, if the conduit is constructed of conventional reinforced bellows tubing, the natural tendency of the conduit under pressure is to straighten out and elongate.

In the prior art one flexible conduit has been developed which successfully withstands elongation under pressure and which provides flexibility in one plane. According to this prior art technique, a pair of non-stretchable fabric strips are affixed to the convolutions of a bellows at points spaced 180° apart, the strips thus functioning to prevent elongation of the bellows and permit flexure of the bellows in a plane perpendicular to the common plane of the strips. Nevertheless, this prior art conduit still is hampered by the fact that a positive pressure differential will produce a straightening force of relatively large magnitude which inhibits flexure in all but the one plane specified above. Consequently, the expenditure of considerable work may be required to flex the conduit to a desired position, and a restraining force may be required to retain the conduit in the position to which it has been bent.

It has been proposed in the past to solve the foregoing problem by constructing pressurized flexible conduits which include two or three rigid tubes intercoupled by metal ball-and-socket joints having a communicating passage therethrough. However, it has been found that this proposed scheme has several inherent disadvantages. Firstly, there is a relatively severe restriction of freedom of movement which often defeats the purpose for which the flexible conduit was intended. Secondly, there is a relatively large amount of friction in the joints, thereby detracting materially from the flexibility of the conduit. Finally, it is virtually impossible to prevent some leakage of fluid from the joints, and although this latter disadvantage may not be particularly damaging in some applications of the conduit, it may be intolerable in others as where the flexible conduit is employed to conduct fluids through a vacuum chamber, for example.

One solution to the foregoing problem is disclosed in copending U. S. patent application, Serial No. 536,596, for "Flexible Pressurized Conduit" filed on September 26, 1955, by Siegfried Hansen. In this particular prior art flexible conduit the internal volume of a bellows tubing of predetermined length is maintained substantially constant throughout the bending range of the bellows by means of a volume stabilizing cable system comprised of one or more stabilizing cables of constant length. Each cable traverses the length of the bellows tubing in at least two spaced positions, the cable being suspended by a pulley system over at least one end of the bellows section whereby bending of the flexible tubing increases the length of cable traversing the tubing at one position while concomitantly decreasing the length which traverses the other position. In this manner the bellows tubing will maintain a constant interior volume in response to bending moments applied thereto, and thus enable bending without expending energy.

The foregoing prior art flexible conduit has, however, several inherent disadvantages. Firstly, the cables tend to wear at the points running over the pulleys, which may cause the cables to rupture and thus create a complete loss of flexibility. This is intolerable in certain applications, as for example, where the flexible conduit is used to provide flexible joints in a pressure suit intended for use by human beings in a vacuum chamber, since a broken cable could cause the flexible tubing to elongate and burst and thereby endanger the inhabitant of the suit. Secondly, the stabilizing cables produce a fairly large static friction force which opposes bending owing to the fact that the cables must be laterally constrained against the side of the bellows through the use of suitable eyelets or the like. Thirdly, this prior art system is capable of operation only when the pressure differentials between the interior of the flexible tubing and the exterior are positive. Therefore, the system cannot operate where the exterior pressure is greater than the interior pressure of the tubing as would be the case, for example, in a diving suit. This limitation is due to the fact that the stabilizing cable must be under tension at all times to be operable, since sables are inherently tension members and are not compressible.

The present invention, on the other hand, overcomes the foregoing and other disadvantages of the flexible pressurized conduits of the prior art by providing improved flexible pressurized conduits which are substantially free from wear and which are completely flexible throughout their bending range despite positive or negative pressure differentials between the internal pressure of the conduit and the external pressure. In accordance with the basic concept of the invention, the flexible pressurized conduits herein disclosed employ a plurality of intercoupled gimbal rings which form a skeletal structure around an associated section of bellows tubing and function to deform the section to a substantially toroidal section in response to bending moments applied thereto whereby the internal volume of the conduit is maintained constant.

More specifically, the pressurized flexible conduits of the invention employ a section of flexible bellows, and a plurality of annular members which circumscribe and laterally constrain the bellows at spaced points along the length thereof, and in addition, function effectively to divide the bellows into a plurality of subsections. The plurality of intercoupled gimbal rings correspond respectively to the bellows subsections, each gimbal ring being operative to maintain constant the internal volume of its associated subsection and to permit flexure thereof, with respect to the remainder of the conduit, about two orthogonal axes.

As will be described in detail hereinafter, each gimbal ring functions as a form of universal joint for its associated bellows subsection, the gimbal having a three dimensional or tetrahedral configuration such that the two orthogonal axes of rotation provided by each gimbal are displaced from each other along the length of the conduit. In operation each gimbal ring is utilized to insure that its associated subsection of conduit will deflect to form a toroidal arc with substantially no change in internal volume in response to applied bending moments; the cumulative action of all of the gimbal rings thus assures that the conduit will deflect to form a toroidal configuration in response to bending moments, the volume of the resultant configuration being the same as the normal volume of the conduit whereby substantially complete flexibility of the conduit is assured.

It is therefore, an object of the invention to provide flexible pressurized conduits which employ a skeletal structure of intercoupled gimbal rings to provide substantially complete flexibility when subjected to pressure.

Another object of the invention is to provide flexible conduits which include a flexible bellows section and a volume constraining conduit skeleton for maintaining substantially constant internal volume of the tube section despite pressurization thereof.

Still another object of the invention is to provide a flexible pressurized conduit which includes a multiple gimbaled skeletal structure for constraining an associated bellows section to bend in a substantially toroidal form when subjected to a bending moment.

A further object of the invention is to provide a flexible pressurized conduit which is constrained to a substantially constant volume throughout its bending range when subjected to either positive or negative pressure differentials between the interior and exterior thereof.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Fig. 1 is a perspective view of a flexible pressurized conduit, in accordance with the invention, illustrating the manner in which the gimbal rings are intercoupled to provide a flexible skeletal structure;

Figs. 2a and 2b are sectional views of two different forms of bellows tubing which may be employed in the flexible conduit of the invention, and illustrate the manner in which the bellows tubing is suspended and laterally constrained;

Figure 3A:
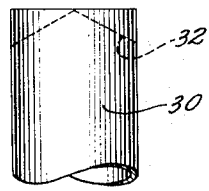
Figs. 3a, 3b and 3c are diagrammatic views illustrating one method of producing the gimbal rings employed in the embodiment of Fig. 1.

Before describing the various embodiments of the invention depicted in the drawings, consider briefly the nature of the forces which normally function to prevent flexure of a flexible conduit when it is under pressure, and the manner in which the normal affect of these forces may be overcome. As described in the aforementioned U. S. patent application, Serial No. 536,596, the forces acting on a flexible conduit under pressure try to eliminate the pressure differential between the inside and outside of the conduit; thus when the internal pressure is greater than the external pressure, the conduit tends to seek that configuration where its volume is largest. It will be recognized, therefore, that complete flexibility of a cylindrical conduit can be achieved despite pressure differentials if the cylinder can be deformed in a manner such that no work is done upon the fluid contained within the section. Stated differently, in order to provide complete flexibility it is a necessary condition that the internal volume of the conduit in its normal cylindrical configuration be maintained substantially constant when the conduit is being flexed or deformed.

As shown in the above-identified copending patent application, the foregoing conditions are satisfied if a cylindrical conduit having a constant cross-sectional area is constrained to deform when flexed to a toroidal configuration whose center length is the same as that of the undeformed or cylindrical configuration. More specifically, the volume of a cylindrical section is:

$$V_C = \pi r^2 L_1 \tag{1}$$

where $r$ is the radius and $L_1$ the length. In a similar manner it may be shown that the volume of a toroidal section is:

$$V_T = \pi r^2 L_2 \tag{2}$$

where $L_2$ is the length of the toroidal section along the centroid of its radial circular cross-section. Inasmuch as it has been postulated that the cross-sectional area of the cylinder is constant, it follows that a completely flexible conduit will result if the normal length $L_1$ of the section in its cylindrical configuration is continuously maintained the same as the centroid length $L_2$ of the toroidal configuration which results when the cylindrical section is deformed.

With reference now to the drawings, wherein like or corresponding parts are designated by the same reference characters throughout the several views, there is shown in Fig. 1 a flexible pressurized conduit, according to the invention, which satisfies the foregoing conditions and thus retains substantially complete flexibility when subjected to bending moments, despite pressure differentials existent between the interior and exterior of the section. As shown in Fig. 1 the flexible conduit of the invention comprises three basic structural elements, namely, a flexible section such as a bellows, for example, which is here shown diagrammatically by the dotted line 10, a plurality of annular supporting members 12 which circumscribe bellows 10 at periodic intervals and function both to constrain the bellows to a cross-sectional area of predetermined size, and to divide the conduit into a plurality of subsections, and a plurality of interconnected gimbal rings 14, one associated with each conduit subsection, for maintaining constant the volume of its associated subsection while simultaneously permitting flexure of the subsection, with respect to adjacent subsections, about two orthogonal axes.

In addition to the foregoing elements the embodiment of the invention shown in Fig. 1 also includes a suitable terminal supporting member 15 at each end of the flexible bellows, only one of these members being shown in the drawing, and a plurality of coupling bars, such as bars 16 and 18, two of these bars being utilized as hinges to intercouple each pair of adjacent gimbal rings, and to couple the end gimbal rings to terminal members 15. As shown in Fig. 1 the coupling bars are either affixed to or pass through the annular supporting members 12 which separate the subsections of conduit.

It should be noted at this point that for simplicity of description only three gimbal rings and their associated structure are shown in Fig. 1. It will be understood from the description set forth hereinbelow, however, that the invention encompasses the use of two or more gimbal rings intercoupled in accordance with the teachings herein disclosed, and that the number of gimbal rings employed in any given application will be determined by the length of the flexible conduit to be constrained and the minimum toroidal radius to which the conduit may be deformed.

In order to facilitate an understanding of the invention, consideration will be given first to the manner in which annular supporting rings 12 function to laterally constrain bellows 10. Referring now to Fig. 2a there is shown a preferred form of bellows conduit which is employed with the particular form of supporting rings shown in Fig. 1, the bellows conduit being of the form disclosed and claimed in copending U. S. patent application, Serial No. 657,608 filed May 7, 1957, for "Bellows Units for Flexible Pressurized Conduits" by Siegfried Hansen. As shown in Fig. 2a, each of the supporting rings 12 is substantially L shaped in cross-sectional configuration and has a flange portion perpendicular to the longitudinal axis of the conduit, and a longitudinal portion which girdles a bellows conduit 10 and is cemented or otherwise affixed thereto.

The particular form of bellows conduit shown in Fig. 2a is preferably manufactured from a relatively nonstretchable rubberized fabric and in the shape of a cylinder whose outside diameter is slightly larger than the inside diameter of supporting rings 12. In forming the bellows unit the supporting rings are affixed to the cylinder of rubberized fabric at equally spaced intervals, the distance between adjacent rings being selected so that when adjacent rings are intercoupled by gimbal rings as shown in Fig. 1, the rubberized fabric is forced back over the longitudinal portion of the supporting ring in a cuff-like manner substantially as shown in Fig. 2a. It will be noted that in operation these cuffs or pleats normally extend approximately half way back over the exterior of the longitudinal portion of the supporting ring, as shown in Fig. 2a; the purpose in thus disposing the bellows conduit is to provide extra fabric between adjacent supporting rings so that the supporting rings may move apart over a 180° arc in response to a bending moment, and to provide extra space for additional fabric to be cuffed concomitantly over the remaining 180° of arc where the adjacent supporting rings are moving toward each other.

It should be understood, of course, that the particular form of the bellows unit shown in Fig. 2a should not restrict the scope of the invention, and that other more conventional forms of bellows conduit may be utilized in practicing the invention. For example, there is shown in Fig. 2b a conventional bellows unit 10 which may be employed in the flexible conduits herein disclosed, the supporting members 12 here being relatively flat annular elements which fit snugly in the convolutions of the bellows and thereby restrain the bellows against lateral expansion while simultaneously dividing the bellows into subsections in the described manner.

Returning now to the description of Fig. 1, the left-hand end of bellows is affixed to terminal member 15 by a suitable clamp, not shown, which hermetically seals the rubberized fabric against a ribbed flange portion 20 of the terminal member. It will be recognized, therefore, that the intercoupled gimbal rings from a skeletal structure inside of which the bellows unit is suspended, each gimbal ring providing a pair of orthogonal axes about which the supporting members at opposite ends of the associated conduit subsection are rotatable with respect to each other. Owing to the fact that any bending moment which may be applied to any individual subsection of conduit may be resolved into a pair of bending moments about the two orthogonal axes of the associated gimbal ring, it will be recognized that the utilization of intercoupled gimbal rings in the manner herein taught provides in essence a series of universal joints which give substantially unencumbered flexibility in all directions.

Consider now the manner in which the gimbal system of Fig. 1 functions to provide substantially complete flexibility to the conduit. It should first be noted that the length of each subsection of conduit is substantially fixed or constant owing to the rigidity of the gimbal rings and the fact that the distance between the orthogonal pivot axes of each gimbal ring is constant. Inasmuch as the application of a bending moment to the flexible conduit will apply substantially equal moments to each of the conduit subsections, it will be recognized that the conduit will flex to a toroidal configuration. If now the length of the entire conduit when in its normal or straight configuration is considered to be the sum of the incremental lengths of the individual subsections of which it is composed, it is clear that the central length of the toroidal configuration which results during and after flexure will also be substantially the sum of the incremental lengths taken through the centers of the individual subsections of the conduit. Consequently the volume of the bellows unit is maintained substantially constant, and in accordance with the theoretical discussion set forth hereinabove, the conduit is thereby rendered completely flexible.

It should be noted now that there is one subtlety, overlooked in the foregoing analysis, which would at first appear to restrict the flexibility of the conduit. More specifically, the bending moment applied to each subsection of the bellows unit is not applied uniformly over the entire subsection, but is instead applied at the pivot axes of the associated gimbal ring. It would therefore seem that within each individual subsection a bending force would act to reduce the volume of the conduit subsection and thus create a restoring force which would tend to elongate or straighten the subsection. It has been found in practice, however, that this restoring force is counterbalanced by the inherent tendency of the bellows tubing to snake, or in other words, to bulge on one side and contract on the other side in seeking a configuration providing maximum volume. Accordingly, the volume of each of the conduit subsections is maintained substantially constant before, during and after flexure, thereby maintaining constant the volume of the entire conduit in the desired manner.

Figure 3B:
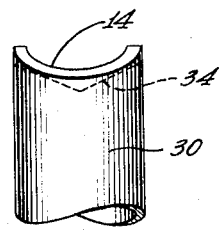
Figure 3C:
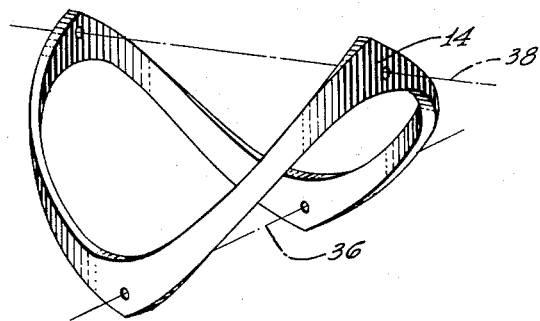

In order to most fully disclose the invention, consideration will now be given to the form of the gimbal rings 13 shown in Fig. 1, and to methods for making them. With reference now to Figs. 3a through 3c it has been found that the gimbal rings may be fabricated readily by first making a chevron-like cut through a hollow metallic tube 30, the machined edge resulting therefrom being shown in Fig. 3a by the dotted line 32. The inside diameter of the tube should of course be slightly larger than the flexible bellows tubing which is to be employed in the conduit for which the gimbal ring is intended.

Following the above operation the metallic tube, which may be aluminum for example, is then rotated 90° as shown in Fig. 3b, and another chevron-like cut is taken along the dotted line designated 34 to produce a gimbal ring 14. The foregoing operations may then be repeated as often as desired to produce a corresponding number of gimbal rings. Referring now to Fig. 3c, after the gimbal ring is constructed in the foregoing manner the apices thereof are drilled as indicated in Fig. 3c so that the coupling bars shown in Fig. 1 may be hingedly mounted thereto. It will be recognized from Fig. 3c that the hinge holes at opposite ends of gimbal ring 14 define a pair of orthogonal axes 36 and 38, and that all four hinge holes define a tetrahedron of constant volume which is rotatable about these two orthogonal axes.

It should be here noted that other hinge structures could be utilized in lieu of the structure shown in Fig. 3c to intercouple adjacent gimbal rings, and that the use of coupling bars as shown in Fig. 1 is not an essential feature of the invention. For example, the gimbal rings could be machined further to provide a tongue and groove arrangement at their apices so that adjacent gimbal rings could be coupled together directly.

Figure 4:
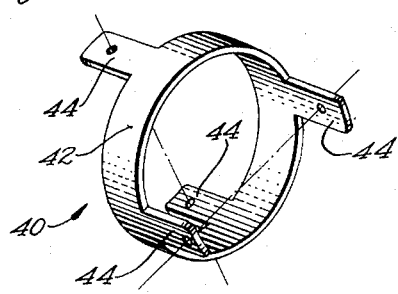
Fig. 4 is a perspective view of an alternative form of gimbal ring which may be utilized in practicing the invention.

Although the gimbal configuration shown in Fig. 3c is considered to be the most efficient structurally and from a weight standpoint, it is clear that other forms of gimbal rings may be utilized to provide a basically tetrahedral structure, and may therefore be employed in practicing the invention. Referring now to Fig. 4, for example, there is shown a gimbal ring 40 which comprises an annular portion 42 and two pairs of appendages 44 on opposite sides thereof in phase quadrature. The equivalence of gimbal 40 and the gimbal of Fig. 3c is readily apparent. Moreover, the utilization of gimbal rings of the form shown in Fig. 4, would permit either the annular bellows supporting rings 12 shown in Fig. 1 to be mounted between adjacent gimbal rings in the manner previously described, or annular central region 42 of the gimbal ring to be an integral part of the bellows supporting members.

It will be recognized that the gimbal structures of Figs. 3c and 4 will both provide a flexible pressurized conduit whose skeletal structure is capable of withstanding compression as well as tensile forces. It follows, therefore, that if the particular bellows employed in the conduit contains reinforcing rings, the conduit will provide substantially complete flexibility not only when the pressure inside the conduit is greater than the external pressure, but also when the pressure differential is of the opposite polarity.

It is to be expressly understood, of course, that numerous other modifications and alterations may be made in the flexible pressurized conduits herein disclosed without departing from the spirit and scope of the invention. For example, it will be recognized that if in operation the pressure inside the bellows always exceeded the external pressure and volumetric efficiency were unimportant, then each gimbal ring could be provided by four cables of equal length strung between adjacent bellows supporting rings in the form of a tetrahedral configuration. Accordingly, it is to be expressly understood that the scope of the invention is to be limited only by the spirit and scope of the appended claims.

What is claimed as new is:

1. A flexible pressurized conduit capable of being easily flexed when subjected to a pressure differential, said conduit comprising: a flexible section of bellows tubing; a plurality of annular members circumscribing said bellows tubing at uniformly spaced points along the length thereof, said members laterally constraining said bellows tubing to a substantially constant circular cross-sectional area and dividing said section of bellows tubing into a plurality of subsections; and a plurality of intercoupled gimbal rings corresponding respectively to said plurality of subsections and operative to form a skeletal structure within which said bellows tubing is suspended, each of said gimbal rings hingedly mounting the annular members at opposite ends of the corresponding subsection of tubing about two mutually orthogonal axes.

2. A flexible pressurized conduit constrained from elongating and capable of being easily flexed when subjected to a pressure differential, said conduit comprising: a flexible section of bellows tubing; a plurality of annular supporting members circumscribing said bellows tubing at uniformly spaced points along the length thereof, said members laterally constraining said bellows tubing to a substantially constant circular cross-sectional area and dividing said section of bellows tubing into a plurality of subsections; and a plurality of intercoupled gimbal rings corresponding to and respectively associated with said plurality of subsections and operative to form a hollow skeletal structure inside of which said bellows tubing is suspended, each of said gimbal rings defining a tetrahedral structure having four apices two of which define a first axis and the other of which defined a second axis displaced from said first axis and orthogonal therewith, each of said gimbal rings hingedly mounting the annular supporting member at one end of the associated bellows subsection about one of said axes and the annular supporting member at the other end of said associated bellows subsection about the other axes.

3. A flexible pressurized conduit constrained from elongating and capable of being easily flexed when subjected to a pressure differential, said conduit comprising: a flexible section of bellows tubing; a plurality of annular members circumscribing said bellows tubing at uniformly spaced points along the length thereof, said members laterally constraining said bellows tubing to a substantially constant circular cross-sectional area and dividing said section of bellows tubing into a plurality of subsections; a plurality of serially intercoupled gimbal rings corresponding to and respectively associated with said plurality of subsections and operative to form a hollow skeletal structure inside of which said bellows tubing is suspended, each of said gimbal rings defining a tetrahedral structure having four apices one pair of which define a first axis and the other pair of which define a second axis displaced from said first axis and orthogonal therewith; and hinge means for hingedly intercoupling each pair of adjacent gimbal rings together along a common one of said axis and for suspending said annular supporting members between adjacent gimbal rings whereby each gimbal ring functions to permit its associated subsection of bellows to deform to a toroidal configuration in response to bending moments applied thereto.

4. In a flexible pressurized conduit constrained to a constant interval volume whereby it may be easily flexed, the combination comprising: a flexible bellows section; first, second and third annular members circumscribing said bellows section at uniformly spaced points along the length thereof, said members laterally constraining said bellows tubing to a substantially constant circular cross-sectional area; first and second serially coupled gimbal rings forming a hollow skeletal structure within which said bellows tubing is suspended, each of said gimbal rings having a first pair of hinge points defining a first axis and a second pair of hinge points defining a second axis displaced from said first axis and orthogonal therewith; means for hingedly mounting said first annular member to said first gimbal ring about said first axis thereof; means for hingedly mounting said second annular member to said first and second gimbal rings about the second axes thereof; and means for hingedly mounting said third annular member to said second gimbal ring about said first axis thereof whereby said gimbal rings longitudinally constrain the bellows section between said first and third annular members and maintain constant the interval volume of said bellows section by deforming said section to a substantially toroidal configuration in response to applied bending moments.

5. A flexible pressurized conduit capable of being easily flexed when subjected to a pressure differential, said conduit comprising: a flexible tubular section; annular members encircling said tubular section at equally spaced intervals for constraining said section to a substantially constant mean cross-sectional area; and means for maintaining substantially constant the volume defined by said tubular section by maintaining constant the volume of said tubular section between adjacent annular members, said means including a plurality of gimbal rings for intercoupling adjacent annular members, each of said gimbal rings having two orthogonal gimbal axes and means for pivotably mounting one of the adjacent annular members about one of said axes and the other of the adjacent annular members about the other of said axis thereby to permit turning of said annular members with respect to each other while maintaining constant the volume of said tubular section.

References Cited in the file of this patent

UNITED STATES PATENTS

| | | |
|---|---|---|
| 1,905,824 | Dysthe | Apr. 25, 1933 |
| 2,755,643 | Wildhaber | July 24, 1956 |

FOREIGN PATENTS

| | | |
|---|---|---|
| 3,129 | Great Britain | Feb. 21, 1889 |